United States Patent
Okajima (10) Patent No.: US 7,161,880 B2
(45) Date of Patent: Jan. 9, 2007

(54) DISK APPARATUS FOR PROJECTING A LASER BEAM ONTO A RECORDING SURFACE OF A DISK RECORDING MEDIUM

(75) Inventor: Tadashi Okajima, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 508 days.

(21) Appl. No.: 10/415,348

(22) PCT Filed: Oct. 3, 2001

(86) PCT No.: PCT/JP01/08738

§ 371 (c)(1),
(2), (4) Date: May 1, 2003

(87) PCT Pub. No.: WO02/39435

PCT Pub. Date: May 16, 2002

(65) Prior Publication Data

US 2004/0052197 A1 Mar. 18, 2004

(30) Foreign Application Priority Data

Nov. 7, 2000 (JP) ............................. 2000-338915

(51) Int. Cl.
  *G11B 7/00* (2006.01)
(52) U.S. Cl. .................. 369/47.38; 369/44.25
(58) Field of Classification Search ............ None
  See application file for complete search history.

(56) References Cited

U.S. PATENT DOCUMENTS

| 4,495,608 A | * | 1/1985 | Kimura et al. | ........... | 369/30.17 |
| 4,698,795 A | * | 10/1987 | Yoshio | ................... | 369/44.28 |
| 4,719,610 A | * | 1/1988 | Bates et al. | .............. | 369/30.17 |

FOREIGN PATENT DOCUMENTS

| JP | 1-259776 A | 10/1989 |
| JP | 3-130934 A | 6/1991 |
| JP | 5-89486 A | 4/1993 |

* cited by examiner

*Primary Examiner*—Brian E. Miller
*Assistant Examiner*—Peter Vincent Agustin
(74) *Attorney, Agent, or Firm*—Westerman, Hattori, Daniels & Adrian, LLP.

(57) ABSTRACT

A disk apparatus (10) includes an optical lens (14). A seek operation is performed by moving the optical lens in a radius direction of a recording surface of a magnetooptical disk (40). When the seek operation is being operated, a TE signal detection circuit (26) generates a TE signal based on a laser beam reflected from the recording surface, and applies a generated TE signal to a DSP (34) via an A/D converter (32*a*). The DSP detects a peak level of the TE signal and a level change amount of the TE signal in a unit time, and generates a tracking actuator control voltage based on the detected peak level and the level change amount. A moving speed of the optical lens is controlled by a generated tracking actuator control voltage.

6 Claims, 7 Drawing Sheets

DISK APPARATUS FOR PROJECTING A LASER BEAM ONTO A RECORDING SURFACE OF A DISK RECORDING MEDIUM

TECHNICAL FIELD

The present invention relates to a disk apparatus. More specifically, the present invention relates to a disk apparatus for moving a lens in a radius direction of a disk recording medium for a seek operation.

PRIOR ART

In conventional such a kind of a disk apparatus, a moving process of a lens at a time of a seek operation is controlled based on a TZC (Tracking Zero Cross) signal generated from a TE (Tracking Error) signal. More specifically, a moving amount of the lens is controlled by counting rises and decays of the TZC signal, and a moving speed of the lens is controlled in such a manner that a period of the TZC signal remains constant.

However, the period of the TZC signal is approximately 1 mili second or so, and a calculation of a control voltage for controlling the moving speed is only performed at every time period of approximately 1 mili second, at best. In addition, a lens position in a radius direction of a disk recording medium is controlled by a control pulse, which is PWM-modulated (PWM pulse). In a case of the PWM pulse, when the calculated control voltage is affected in a pulse width is in a subsequent period so that a time-related loss equal to one pulse period (=5 micro seconds) occurs from a time that the control voltage is calculated until the PWM pulse having a desired pulse width is output. Therefore, in the prior art, it is not possible to meticulously control the lens moving speed.

SUMMARY OF THE INVENTION

Therefore, it is a primary object of the present invention to provide a novel disk apparatus.

It is another object of the present invention to provide a disk apparatus capable of meticulously controlling a lens moving speed at a time of a seek operation.

A lens converges a laser beam onto a track formed on a recording surface of a disk recording medium. The seek operation is performed by moving the lens in a radius direction of the recording surface. At a time of the seek operation, a generating means generates a tracking error signal based on the laser beam reflected from the recording surface. A peak level of a generated tracking error signal is detected by a peak level detection means. A level change amount of the tracking error signal in a unit time is detected by a level change amount detection means. A controlling means controls a moving speed of the lens based on the detected peak level and the level change amount.

A frequency of the tracking error signal, that is, the moving speed of the lens can be estimated from the peak level of the tracking error signal and the level change amount in the unit time. Accordingly, the moving speed of the lens is controlled based on the peak level and the level change amount. Therefore, it is possible to meticulously control the moving speed of the lens.

In a certain aspect of the present invention, the level change amount is compared with a threshold value by a comparing means. The threshold value is decided based on the peak level by a deciding means. A changing means changes the moving speed according to a comparison result.

Preferably, the threshold value is rendered higher in accordance with a magnitude of an absolute value of the peak level.

Preferably, the comparing means compares the level change amount with a first threshold value or a second threshold value, which is smaller than the first threshold value. The changing means decelerates the moving speed when the level change amount is above the first threshold value, and accelerates the moving speed when the level change amount is below the second threshold value.

In another aspect of the present invention, the level of the tracking error signal is sampled by a frequency equal to or larger than two times a maximum frequency of the tracking error signal. A waveform of the tracking error signal is exactly grasped in according to a sampling theorem. A difference of the two levels successively sampled out of the levels sampled by such the sampling frequency is the above-described level change amount.

It is noted that preferably, whether or not the two levels successively sampled satisfy a predetermined condition is determined by the determining means, and when the two levels satisfy the predetermined condition, a detection of the level change amount is performed. Preferably, the predetermined condition is that the absolute value of each the two levels is below a third threshold value associated with the peak level.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
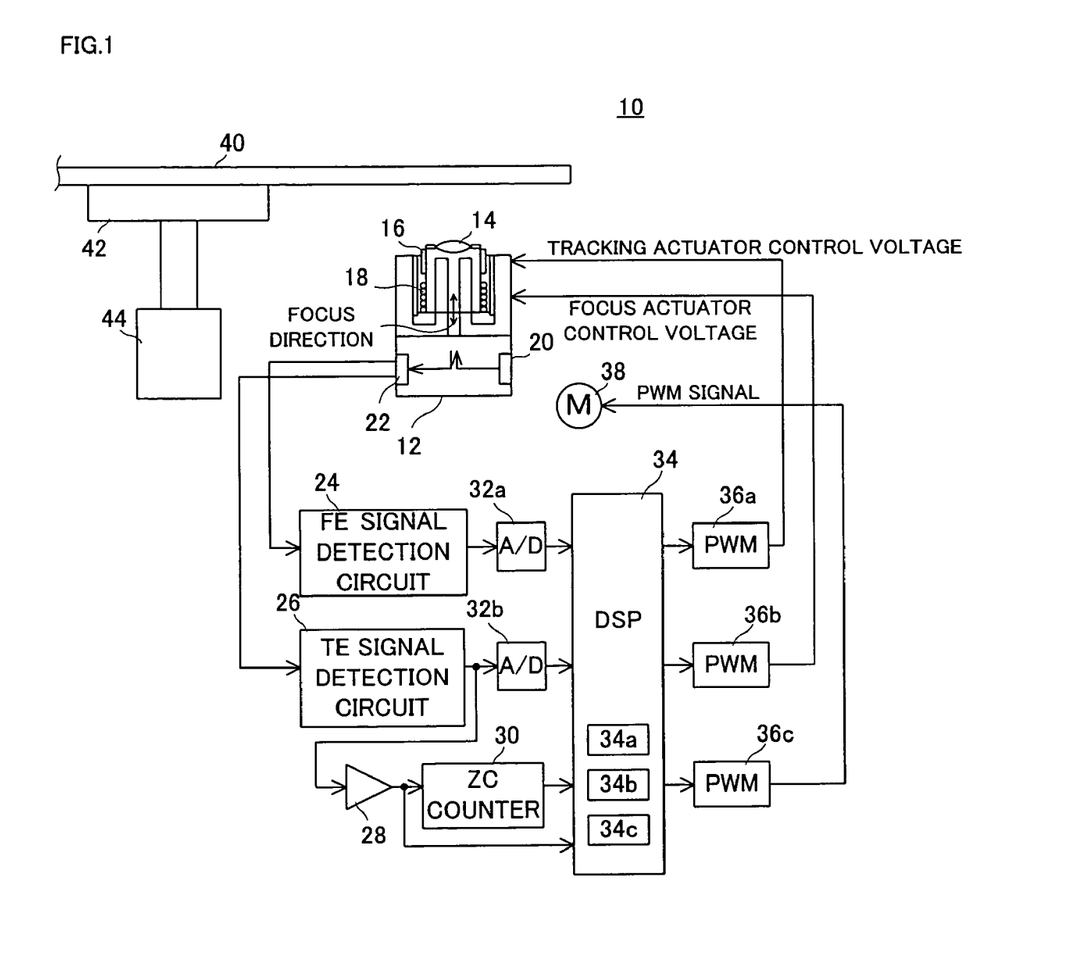
FIG. 1 is a block diagram showing one embodiment of the present invention.

Referring to FIG. 1, an optical disk apparatus 10 in this embodiment includes an optical pick-up 12 formed with an optical lens 14. The optical lens 14 is supported by a tracking actuator 16, and a focus actuator 18. A laser beam released from a laser diode 20 is converged by the optical lens 14 before being radiated upon a recording surface of a magnetooptical disk 40. This allows a desired signal to be recorded into the magnetooptical disk 40 or the desired signal to be reproduced from the magnetooptical disk 40.

The laser beam reflected from the recording surface is transmitted through the optical lens, and then, radiated onto a light detector 22. An output of the light detector 22 is input into an FE signal detection circuit 24, and a TE signal detection circuit 26. The FE signal detection circuit 24 detects an FE (Focus Error) signal based on an output of the light detector 22, and the TE signal detection circuit 26 detects a TE signal based on an output of the light detector 22. The detected FE signal and TE signal are respectively applied to a DSP (Digital Signal Processor) 34 via A/D converters 32a and 32b.

The DSP 34 executes a focus servo process based on the FE signal, and executes a tracking servo process and a sled servo process based on the TE signal. The focus servo process generates a focus actuator control voltage, the tracking servo process generates a tracking actuator control voltage, and the sled servo process generates a sled control voltage. The focus actuator control voltage is output to the focus actuator 18 via a PWM demodulation circuit 36b, and this controls a position of the optical lens 14 in an optical axis direction. The tracking actuator control voltage is output to the tracking actuator 16 via a PWM demodulation circuit 36a, and this controls a position of the optical lens 14 in a radius direction (as for the recording surface). The sled control voltage is output to a sled motor 38 via a PWM demodulation circuit 36c, and this controls a rotating direction and a rotating speed of the sled motor 38.

Figure 2:
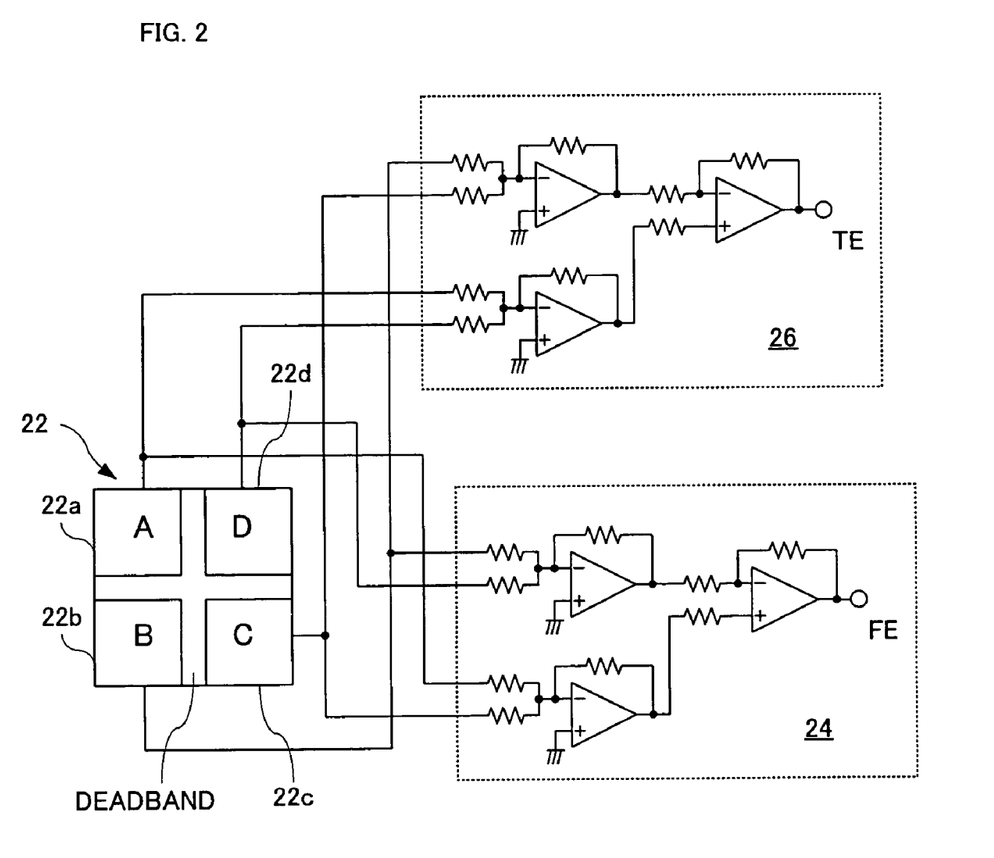
FIG. 2 is a circuit diagram showing a light detector, a TE signal detection circuit, and an FE signal detection circuit.

The light detector 22, the FE signal detection circuit 24, and the TE signal detection circuit 26 are constituted as shown in FIG. 2. The light detector 22 has four detection elements 22a–22d. Outputs of the four detection elements 22a–22d are subjected to operations, which are different with each other in the FE signal detection circuit 24 and the TE signal detection circuit 26. More specifically, Equation 1 is performed in the FE signal detection circuit 24, and Equation 2 is performed in the TE signal detection circuit 26.

$$FE=(A+C)-(B+D) \quad \text{[Equation 1]}$$

$$TE=(A+D)-(B+C) \quad \text{[Equation 2]}$$

It is noted that "A"–"D" in the Equation 1 and Equation 2 correspond to an output of the detection elements 22a–22d, respectively. In addition, the detection elements 22a, and 22d detect an optical component of a left half in a trace direction out of the laser beam, and the detection elements 22b, and 22c detect the optical component in of a right half in the trace direction out of the laser beam.

The TE signal is also compared with a predetermined threshold value by a comparator 28, and a TZC (Tracking Zero Cross) signal is output from the comparator 28. When the optical lens 14 moves in the radius direction of the recording surface of the magnetooptical disk 44 for a seek operation, the TE signal draws a waveform shown in FIG. 3(A), and the TZC signal draws a waveform shown in FIG. 3(B). That is, the TZC signal rises at a zero level during a course that the TE signal changes from a minus level to a plus level, and decays at a zero level during a course that the TE signal changes from the plus level to the minus level. The TZC signal output from the comparator 28 is applied to a ZC counter 30, and the DSP 34. The ZC counter 30 counts the risings of the TZC signal, and applies a count value to the DSP 34.

Figure 3:
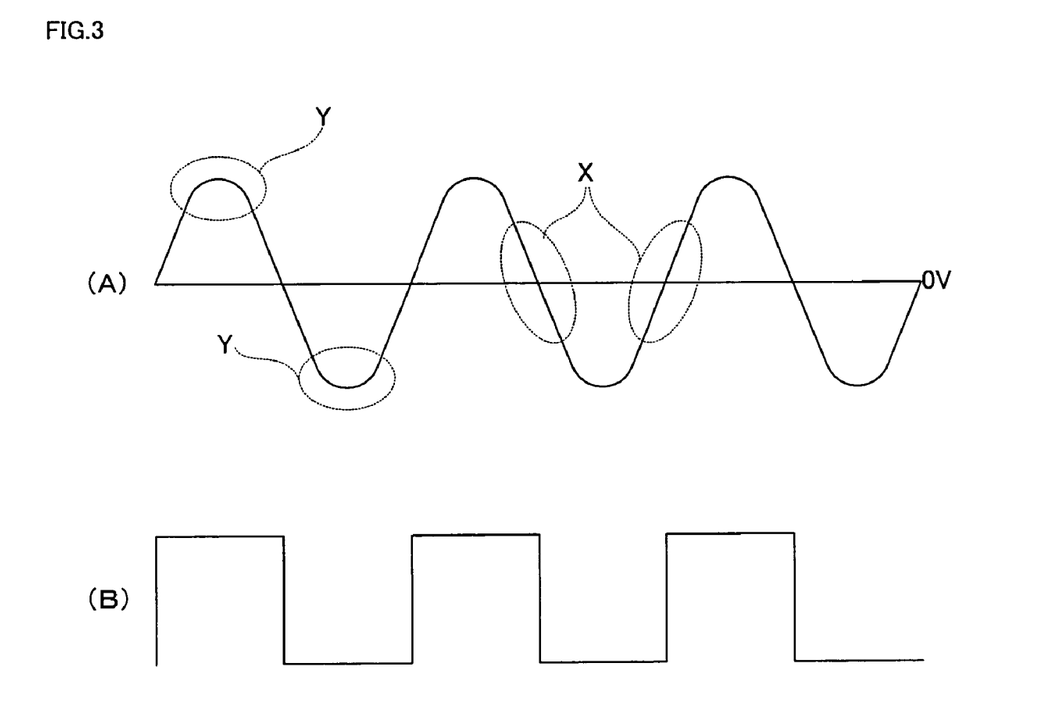
FIG. 3(A) is a waveform chart showing a TE signal.
FIG. 3(B) is a waveform showing a TZC signal.

The DSP 34 samples a level value of the TE signal fetched from the A/D converter 32a at every 10 micro seconds (sampling frequency; 100 KHz), and detects the peak level of the TE signal in an immediately preceding half-period, and a change amount of the two level values sampled in the vicinity of the zero cross (portion X shown in FIG. 3). The frequency of the TE signal is 3 KHz at the maximum, and if the sampling is applied by the frequency equal to or larger than 6 KHz, it is possible to exactly grasp a change of the TE signal (Sampling Theorem). In this embodiment, the sampling frequency of the TE signal is 100 KHz, which is extraordinarily higher than 6 KHz, so that the waveform of the TE signal is exactly grasped.

The waveforms of the TE signal having the frequency or the peak level different to each other are shown in FIG. 4(A)-FIG. 4(C). The frequency of the TE signal shown in FIG. 4(A) or FIG. 4(C) is two times larger than the frequency of the TE signal shown in FIG. 4(B). Furthermore, the peak level of the TE signal shown in FIG. 4(A) or FIG. 4(B) is two times larger that the peak level of the TE signal shown in FIG. 4(C). It is noted that a change of the peak level attributes to a laser power set to the laser diode 20.

Figure 4:
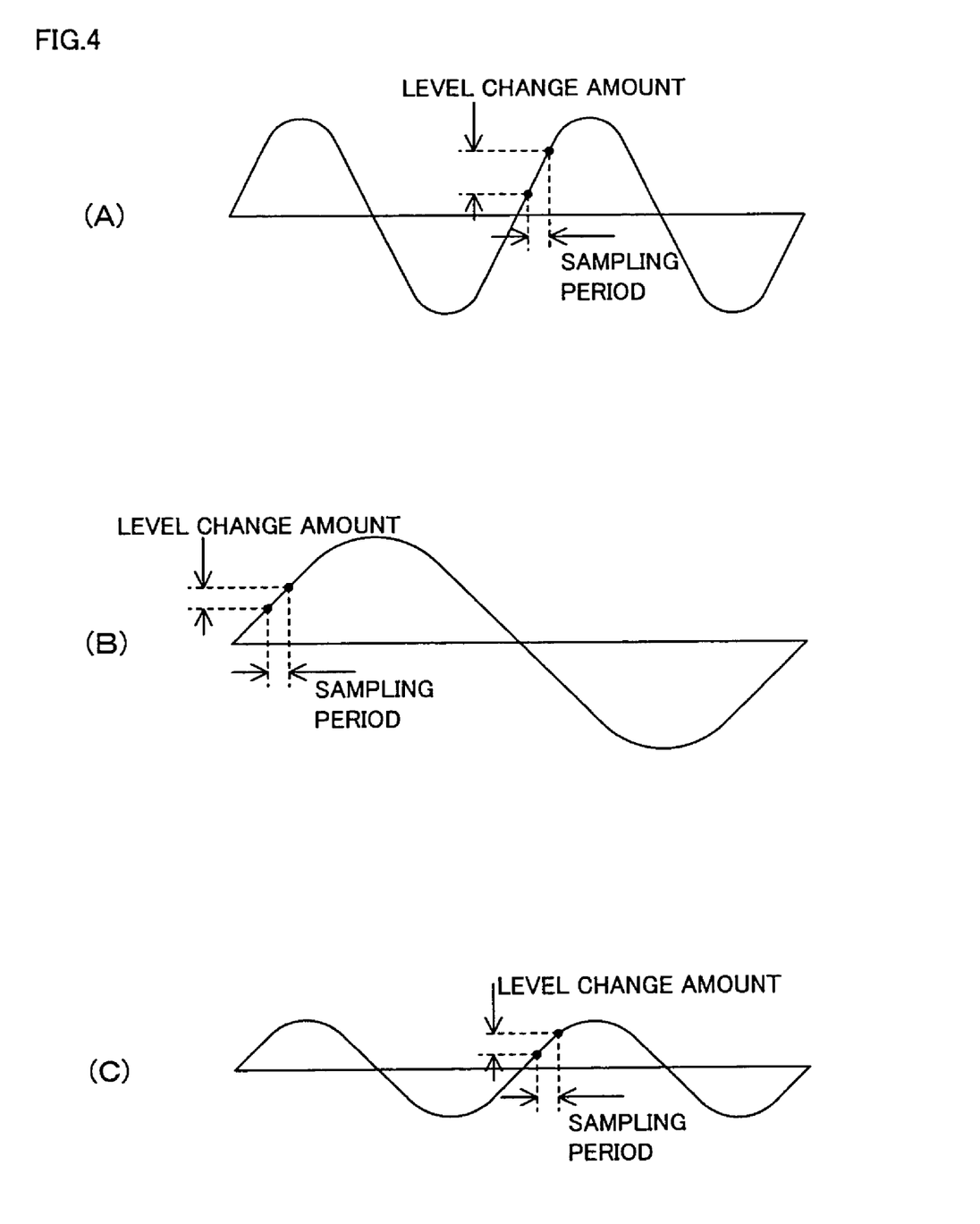
FIG. 4 is an illustrative view showing one portion of an operation of FIG. 1 embodiment.

Between the TE signal shown in FIG. 4(A), and the TE signal shown in FIG. 4 (B), the peak level is the same. However, since the frequency is different to each other, a level change amount in a unit time is also different to each other. Between the TE signal shown in FIG. 4(A), and the TE signal shown in FIG. 4(C), the frequency is the same. However, since the peak level is different to each other, the level change amount in a unit time is also different to each other. Between the TE signal shown in FIG. 4(B), and the TE signal shown in FIG. 4(C), both the peak level and the frequency are different to each other. However, the level change amount is coincident to each other.

That is, as for a changing factor of the level change amount, there are two factors, i.e. the peak level, and the frequency. Accordingly, unless the two parameters are detected, it is impossible to estimate the frequency of the TE signal, and control the moving speed of the optical lens 14, either. Due to this, the DSP 34 detects both the peak level and the level change amount in the unit time, and based thereon, controls the moving speed of the optical lens 14. In FIG. 4(A), and FIG. 4(C), the moving speed of the optical lens 14 is decreased, assuming that the frequency of the TE signal is high, and the moving speed of the optical lens 14 is fast. On the other hand, in FIG. 4(B), the moving speed of the optical lens 14 is increased, assuming that the frequency of the TE signal is low, and the moving speed of the optical lens 14 is slow.

Figure 5:
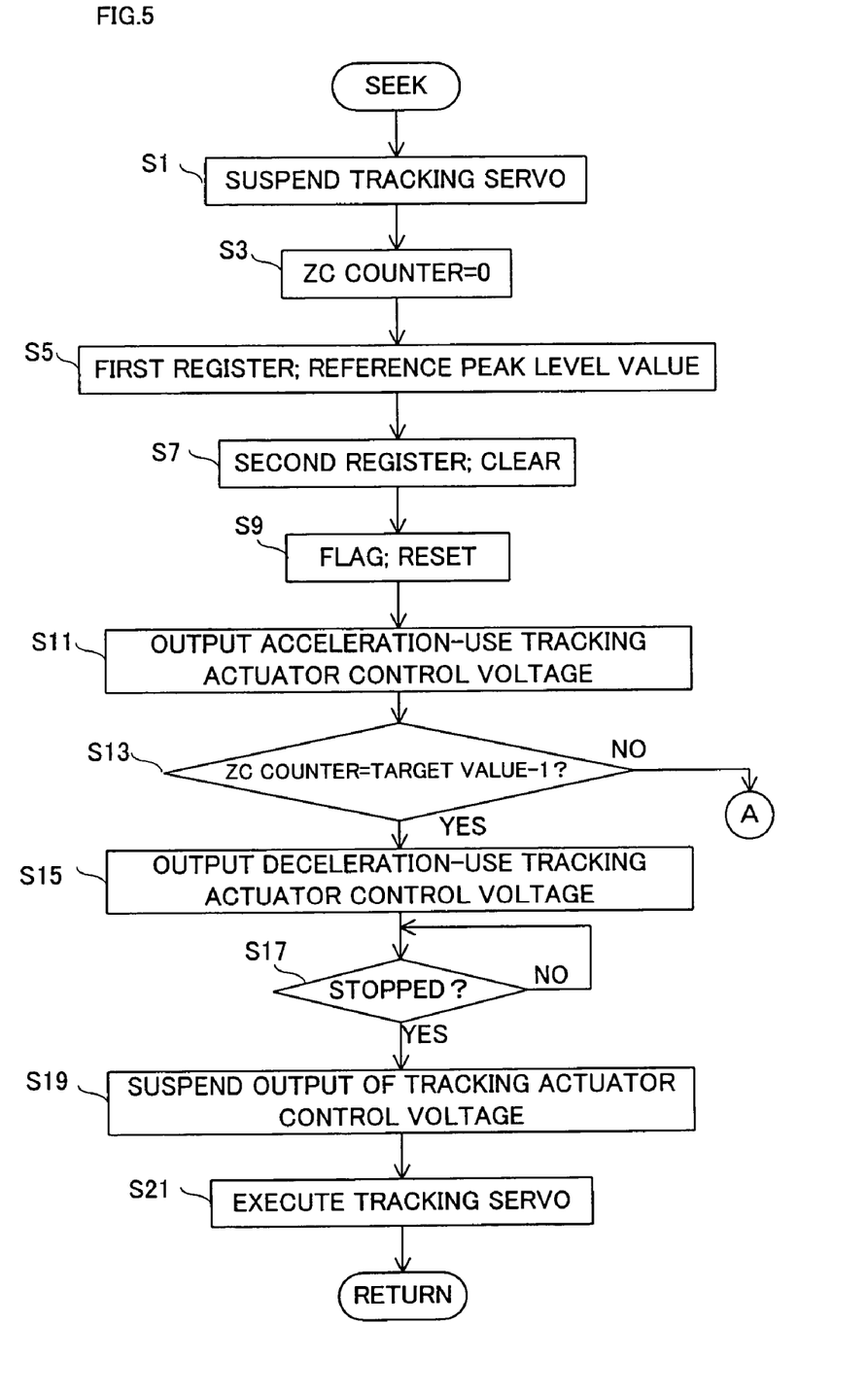
FIG. 5 is a flowchart showing one portion of an operation of a DSP at a time of a seek operation.
Figure 6:
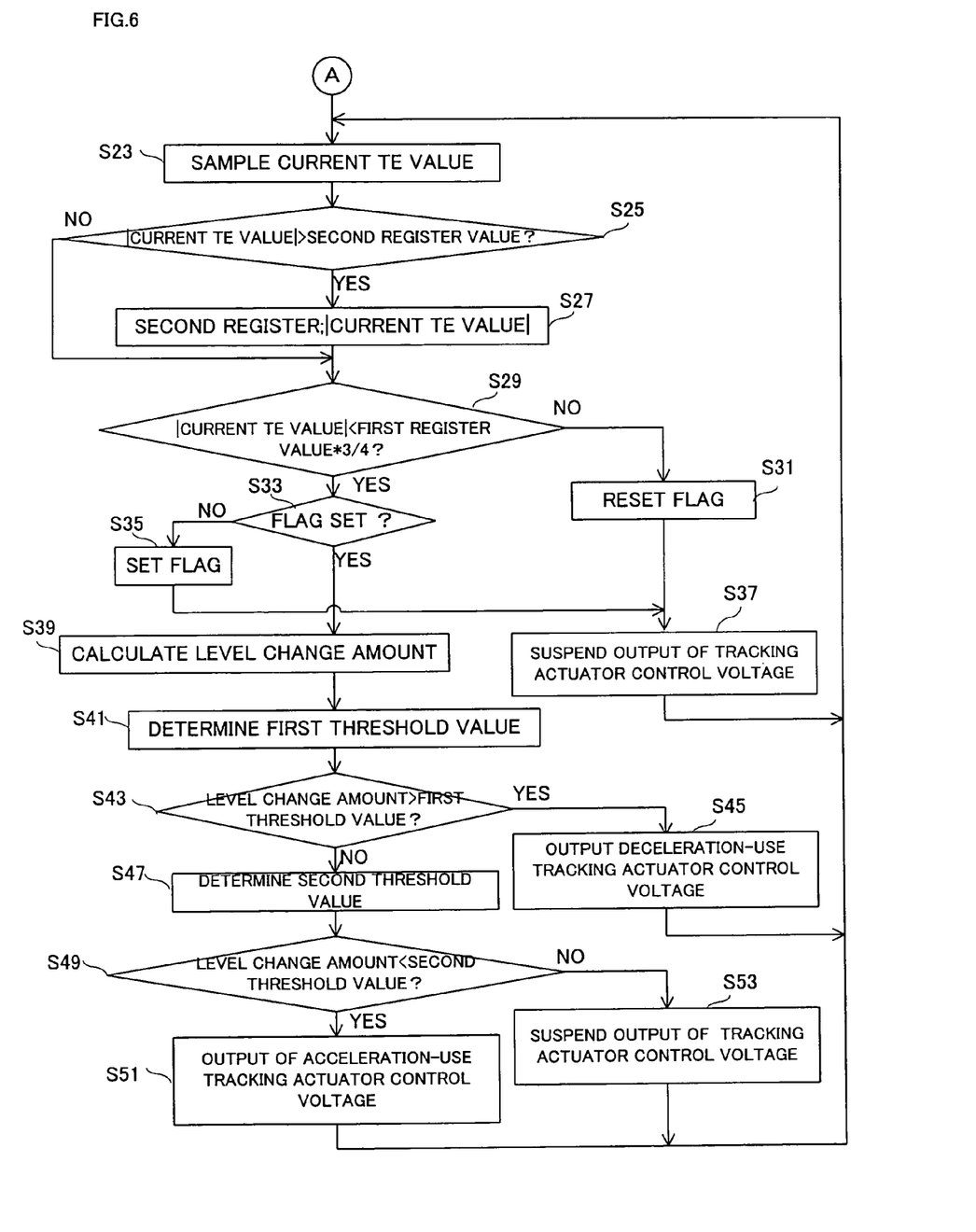
FIG. 6 is a flowchart showing another portion of the operation of the DSP at a time of the seek operation.

More specifically, the DSP 34 controls the seek operation in accordance with flowcharts shown in FIG. 5 and FIG. 6. The DSP 34 also processes a flowchart shown in FIG. 7 in response to the rises or the decays of the TZC signal. The DSP 34 is, in reality, formed of a logical circuit. However, for the sake of descriptions, its operations are described using the flowchart. It is noted that in the seek operation of this embodiment, only the optical lens 14 moves in the radius direction on the recording surface, and the optical pick-up 12 remains constant.

Firstly, a tracking servo is suspended in a step S1, and the ZC counter 30 is reset in a step S3. Next, a reference peak level value is set to a first register 34a in a step S5, a second register 34b is cleared in a step S7, and a flag 34c is reset in a step S9. The reference peak level value is an absolute value of the peak level of the TE signal obtained when a reference laser power is set to the laser diode 20. In addition, for the sake of descriptions, a setting value of the first register 34a is defined as "first register value", and the setting value of the second register 34b is defined as "second register value".

Upon completion of the process in the step S9, an acceleration-use tracking actuator control voltage is output in a step S11. The PWM demodulation circuit 36a applies to the tracking actuator 16 the PWM signal having a pulse width corresponding to the tracking actuator control voltage. This allows the optical lens 14 to start moving in the radius direction of the recording surface. In accordance with the movement of the optical lens 14, the TZC signal is output from the comparator 28. The ZC counter 30 is incremented in response to the rise of the TZC signal.

Figure 7:
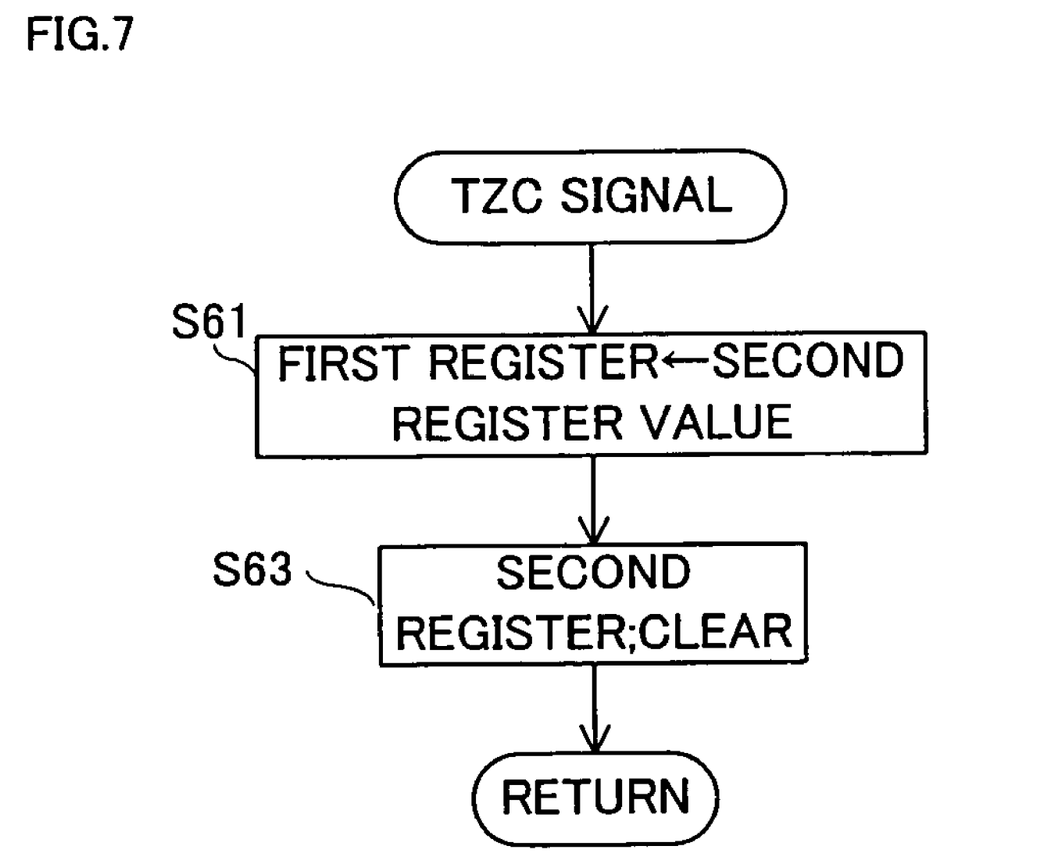
FIG. 7 is a flowchart showing one portion of the operation of the DSP when the TZC signal rises or decays.

When the TZC signal rises or decays, that is, when the TE signal crosses at the zero level, the DSP 34 processes a flowchart shown in FIG. 7. Firstly, the second register value is caused to refuge to the first register 34a in a step S61, and the second register 34b is cleared in a step S63. Such the processes allow the absolute value of the peak level of the TE signal in a immediately preceding half-period to be always secured in the first register 34a.

Returning to FIG. 5, it is determined whether or not a count value of the ZC counter 30 reaches a "target value−1" in a step S13. If YES, a deceleration-use tracking actuator control voltage is output in a step S15. The PWM demodulation circuit 36a subjects tracking actuator control voltage to a PWM demodulation, and applies the PWM signal to the tracking actuator 16. This applies a brake on the optical lens 14. In a subsequent step S17, it is determined whether or not the optical lens 14 is suspended, and if YES, the output of the tracking actuator control voltage is suspended in a step S19, and the tracking servo is executed in a step S21. Upon completion of the process in the step S21, the process returns to a main routine (not shown).

If the count value of the ZC counter 30 does not reach the "target value−1", the process proceeds from the step S13 to a step S23 so as to sample a current level value of the TE signal (current TE value) input from the A/D converter 32b. In a subsequent step S25, an absolute value of the sampled current TE value (|current TE value|) is compared with the second register value. If |current TE value| is smaller than or equal to ($\leq$) the second register value, the process directly advances to a step S29. However, if the |current TE value| is larger than (>) the second register value, the |current TE value| is set to the second register 34b in a step S27 before advancing to the step S29. The process in the step S27 allows the absolute value of the peak level in each half-period to be secured in the second register 34b. The second register value is caused to refuge to the first register 34a at every half-period as described above.

In the step S29, |current TE value| is compared with a ¾ value of the first register value. Herein, if |current TE value| is larger than or equal to ($\geq$) the first register value*¾, the flag 34c is reset in a step S31 before advancing to a step S37. In addition, as long as the flag 34c is in a reset state, even if |current TE value| is smaller than (<) the first register value * ¾, NO is determined in a step S33, and the flag 34c is set in a step S35 before advancing to the step S37. An output of the tracking actuator control voltage is suspended in the step S37, and due to an inertia, the optical lens 14 is to move in the radius direction. Upon completion of the step S37, the process returns to the step S23.

Referring to FIG. 3, at a portion Y in the vicinity of the peak level of the TE signal, a movement of an inclination of the waveform is sharp. It is not possible to estimate the frequency of the TE signal from the two TE values detected from such the portion Y. Due to this, when even one of the two TE values successively sampled is included in the portion Y, the flag 34c is reset, and the output of the tracking actuator control voltage is suspended before returning to the step S23.

If |current TE value| is smaller than (<) the first register value*¾, and the flag 34c is in a set state, the process advances from the step S33 to a step S39 assuming that both the TE value sampled last time (preceding TE value) and the TE value sampled this time (current TE value) are obtained from a portion X shown in FIG. 3.

The level change amount is calculated according to Equation 4 in a step S39. The level change amount is expressed by an absolute value of a difference between the preceding TE value and the current TE value.

level change amount=|preceding TE value−current TE value| [Equation 3]

In a subsequent step S41, a first threshold value for determining whether or not the moving speed of the optical lens 14 must be reduced is decided according to Equation 4.

first threshold value=first reference threshold value*first register value/reference peak level value [Equation 4]

The first reference threshold value is a threshold value that becomes optimum when the peak level value of the TE signal is equal to the reference peak level value, not an optimum threshold value for the TE signal having the peak level value different from the reference peak level value. Due to a fact that the smaller the peak level amount, the smaller the level change amount as understood from FIG. 4(A), and FIG. 4(C), the first threshold value also needs to be small. In contrast, due to a fact that the larger the peak level value, the larger the level change amount, the first threshold value also needs to be large. Due to this, the first change amount is corrected according to Equation 4.

In a subsequent step S43, the level change amount is compared with the first threshold value. Herein, if the level change amount is larger than (>) the first threshold value, the deceleration-use tracking actuator control voltage is output in a step S45, assuming that the moving speed of the optical lens 14 is too fast. Upon completion of the step S45, the process returns to the step S23.

On the other hand, if the level change amount is smaller than or equal to ($\leq$) the first threshold value, the process advances to a step S47 so as to decide a second threshold value for determining whether or not the moving speed of the optical lens 14 is to be increased according to Equation 5. This operation is performed according to the above described manner.

second threshold value=second reference threshold value*first register value/reference peak level value [Equation 5]

The level change amount is compared with the second threshold value in a step S49, and if the level change amount is smaller than (<) the second threshold value, the acceleration-use tracking actuator control voltage is output in a step S51, assuming that the moving speed of the optical lens 14 is too slow. In contrast, if the level change amount is larger than or equal to ($\geq$) the second threshold value, the output of the tracking actuator control voltage is suspended in a step S53. Upon completion of the process in the step S51 or step S53, the process returns to the step S23. It is noted that the sampling frequency of the TE signal is 100 KHz as described above, and therefore, the process in the step S23 is repeated at every 10 micro seconds.

As understood from the above descriptions, the optical lens 14 radiates the laser beam onto the track formed on the recording surface of the magnetooptical disk 40. The seek operation is performed by moving the optical lens 14 in the radius direction of the recording surface. At a time of the seek operation, the TE signal detection circuit 26 generates the TE signal based on the laser beam reflected from the recording surface, and applies the generated TE signal to the DSP 34 via the A/D converter 32a. The DSP 34 detects the peak level of the TE signal and the level change amount of the TE signal in the unit time, and based thereon, generates the tracking actuator control voltage. The moving speed of the optical lens 14 is controlled by the generated tracking actuator control voltage.

The frequency of the TE signal, that is, the moving speed of the optical lens 14 can be estimated from the peak level of the TE signal and the level change amount of the peak level in the unit time. Due to this, as a result of the tracking actuator control voltage being output based on the peak level and the level change amount, it is possible to meticulously control the moving speed of the optical lens 14.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk apparatus for moving a lens converging a laser beam onto a track formed on a recording surface of a disk recording medium in a radius direction of said recording surface for a seek operation, comprising:
   a generating means for generating a tracking error signal based on the laser beam reflected from said recording surface;
   a peak level detection means for detecting a peak level of said tracking error signal;
   a level change amount detection means for detecting a level change amount of said tracking error signal in a unit time; and
   a controlling means for controlling a moving speed of said lens based on said level change amount and said peak level, wherein said controlling means includes a comparing means for comparing said level change amount with a threshold value, a changing means for changing said moving speed depending upon a comparison result of said comparing means, and a deciding means for deciding said threshold value based on said peak level.

2. A disk apparatus according to claim 1, wherein said deciding means increases said threshold value in accordance with a magnitude of an absolute value of said peak level.

3. A disk apparatus according to claim 1 or 2, wherein said comparing means includes a first comparing means for comparing said level change amount with a first threshold value, and a second comparing means for comparing said level change amount with a second threshold value smaller than said first threshold value, and said changing means includes a decelerating means for decelerating said moving speed when said level change amount is above said first threshold value, and an accelerating means for accelerating said moving speed when said level change amount is below said second threshold value.

4. A disk apparatus according to claim 1 to 2, further comprising a sampling means for sampling a level of said tracking error signal by a frequency, which is equal to or larger than two times a maximum frequency of said tracking error signal, wherein said level change amount detection means detects as said level change amount a difference of two said levels successively sampled by said sampling means.

5. A disk apparatus according to claim 4, further comprising:
   a determining means for determining whether or not said two levels satisfy a predetermined condition; and
   an activating means for activating said level change amount detection means when said two levels satisfy said predetermined condition.

6. A disk apparatus according to claim 5, wherein said predetermined condition is that an absolute value of each of said two levels is below a third threshold value associated with said peak level.

* * * * *